US009422874B2

(12) United States Patent
Lukaczyk et al.

(10) Patent No.: US 9,422,874 B2
(45) Date of Patent: Aug. 23, 2016

(54) SIMPLIFIED METHOD TO INJECT ETHANOL OR OTHER SOLUTION ADDITIVES INTO DIESEL ENGINES EQUIPPED WITH A DIGITAL DATA BUS

(71) Applicant: Electromotive, Inc., Manassas, VA (US)

(72) Inventors: William A. Lukaczyk, Clifton, VA (US); Jonathan W. Rawlings, Clifton, VA (US)

(73) Assignee: ELECTROMOTIVE, INC., Manassas, VA (US)

( * ) Notice: Subject to any disclaimer, the term of this patent is extended or adjusted under 35 U.S.C. 154(b) by 282 days.

(21) Appl. No.: 14/097,507

(22) Filed: Dec. 5, 2013

(65) Prior Publication Data

US 2014/0156167 A1    Jun. 5, 2014

Related U.S. Application Data

(60) Provisional application No. 61/733,894, filed on Dec. 5, 2012, provisional application No. 61/789,327, filed on Mar. 15, 2013, provisional application No. 61/804,727, filed on Mar. 24, 2013.

(51) Int. Cl.
| | | |
|---|---|---|
| *F02D 19/12* | (2006.01) | |
| *F02D 41/30* | (2006.01) | |
| *F02D 19/06* | (2006.01) | |
| *F02B 47/02* | (2006.01) | |
| *F02M 25/022* | (2006.01) | |
| *F02D 41/00* | (2006.01) | |

(52) U.S. Cl.
CPC ............... *F02D 19/12* (2013.01); *F02B 47/02* (2013.01); *F02D 19/066* (2013.01); *F02D 41/3094* (2013.01); *F02D 41/0025* (2013.01); *F02M 25/022* (2013.01); *Y02T 10/121* (2013.01)

(58) Field of Classification Search
CPC ..... F02D 19/12; F02D 41/0025; F02D 41/02; F02D 41/26; F02D 41/28; F02D 2041/281; F02D 2041/285; F02D 41/3082; F02D 43/04; F02D 2200/10; F02D 2400/11; F02D 19/066; F02D 41/34; F02D 41/345; F02B 47/00; F02B 47/02; F02B 47/04; F02B 49/00; F02B 51/00; F02M 25/00; F02M 25/022; F02M 25/0228
USPC .............................. 123/1 A, 575–578, 198 A
See application file for complete search history.

(56) References Cited

U.S. PATENT DOCUMENTS

| | | | | |
|---|---|---|---|---|
| 4,253,436 | A * | 3/1981 | Dudrey ................. | F02M 43/00 123/1 A |
| 4,495,930 | A * | 1/1985 | Nakajima ............. | F02D 19/081 123/1 A |
| 4,612,904 | A * | 9/1986 | Tadokoro ............. | F02D 41/10 123/492 |
| 5,068,794 | A * | 11/1991 | Hosaka ................ | F02D 41/045 123/478 |

(Continued)

FOREIGN PATENT DOCUMENTS

WO     2015/074143 A1    5/2015

*Primary Examiner* — Thomas Moulis
(74) *Attorney, Agent, or Firm* — Nixon & Vanderhye P.C.

(57) ABSTRACT

A system for the delivery of ethanol or other solution additives to the intake manifold of compression ignition diesel engines comprising an electronic control module containing a microcomputer capable of monitoring SAE J1939 serial data, receive a signal from an additive monitoring sensor and have outputs to turn on a pump relay, indicator lamp and from 1 to n pulse width modulated electrical fluid injectors.

20 Claims, 13 Drawing Sheets

Ethanol additive system with use of J1939 data

(56) References Cited

U.S. PATENT DOCUMENTS

| | | | | |
|---|---|---|---|---|
| 5,195,466 A * | 3/1993 | Schulte | F02M 25/00 | 123/1 A |
| 5,331,994 A * | 7/1994 | Bryan, III | F02B 47/00 | 123/1 A |
| 5,351,656 A * | 10/1994 | Teramoto | F02B 75/16 | 123/3 |
| 5,441,072 A * | 8/1995 | Indey | F02D 19/12 | 123/1 A |
| 5,964,089 A * | 10/1999 | Murphy | B01D 53/90 | 60/274 |
| 6,044,014 A * | 3/2000 | Komori | G11C 16/06 | 365/185.04 |
| 6,068,672 A * | 5/2000 | Watson | B60K 15/00 | 123/1 A |
| 6,249,216 B1 * | 6/2001 | Flick | B60R 16/03 | 180/287 |
| 6,276,310 B1 * | 8/2001 | Backes | F02D 19/12 | 123/1 A |
| 6,877,488 B2 * | 4/2005 | Washeleski | B60K 15/03504 | 123/41.31 |
| 7,152,133 B2 * | 12/2006 | McClure | G06F 13/385 | 710/100 |
| 7,192,463 B2 * | 3/2007 | Shutty | F01N 13/008 | 174/50 |
| 7,207,318 B2 * | 4/2007 | Lepperhoff | F01M 1/22 | 123/438 |
| 7,369,936 B2 * | 5/2008 | Flick | B60R 16/03 | 307/10.6 |
| 7,428,890 B2 * | 9/2008 | Lay | F02M 37/0047 | 123/1 A |
| 7,444,987 B2 * | 11/2008 | Cohn | F02B 47/04 | 123/1 A |
| 7,580,808 B2 * | 8/2009 | Bos | G07C 5/085 | 701/102 |
| 7,823,562 B2 * | 11/2010 | Duineveld | F02D 19/0628 | 123/1 A |
| 8,061,383 B2 * | 11/2011 | Gouzou | F02D 19/12 | 123/1 A |
| 8,267,064 B2 * | 9/2012 | Martin | F02D 19/0647 | 123/1 A |
| 8,285,446 B2 * | 10/2012 | Daly | H04B 1/082 | 370/254 |
| 8,424,496 B2 * | 4/2013 | Pursifull | F02D 19/081 | 123/1 A |
| 8,434,431 B2 * | 5/2013 | Fried | F02B 47/02 | 123/1 A |
| 8,498,799 B2 * | 7/2013 | Matthews, Jr. | F02D 41/3094 | 123/525 |
| 8,801,393 B2 * | 8/2014 | Crabtree | B60K 25/02 | 180/305 |
| 8,825,224 B2 * | 9/2014 | Fazi | F02D 45/00 | 701/2 |
| 8,833,148 B2 * | 9/2014 | Stack | F02D 41/221 | 73/114.45 |
| 8,938,565 B2 * | 1/2015 | Aubertin | B60R 25/04 | 307/10.6 |
| 9,080,517 B2 * | 7/2015 | Guido | F02D 19/0602 | |
| 2003/0062028 A1 * | 4/2003 | Kitagawa | F02D 41/105 | 123/486 |
| 2005/0179323 A1 * | 8/2005 | Flick | B60R 16/03 | 307/10.6 |
| 2005/0235958 A1 * | 10/2005 | Matsumura | F02D 41/08 | 123/431 |
| 2006/0254536 A1 * | 11/2006 | Waters | F02M 25/00 | 123/1 A |
| 2007/0131180 A1 * | 6/2007 | Roehm | F02B 47/02 | 123/25 A |
| 2009/0126691 A1 * | 5/2009 | Bach | F02B 29/0418 | 123/480 |
| 2009/0138181 A1 * | 5/2009 | Hokuto | F02D 41/1475 | 701/106 |
| 2010/0049417 A1 * | 2/2010 | Bailey | C25B 1/04 | 701/100 |
| 2011/0202256 A1 * | 8/2011 | Sauve | F02D 41/0025 | 701/104 |
| 2013/0103286 A1 * | 4/2013 | Guido | F02D 19/0602 | 701/103 |
| 2013/0179050 A1 * | 7/2013 | Munshi | F02B 43/10 | 701/104 |
| 2015/0252771 A1 * | 9/2015 | Shoda | F02D 41/065 | 123/445 |

* cited by examiner

Figure 1
Ethanol additive system
without use of J1939 data

Figure 2
Waveforms of Additive Solution Injection

Ethanol additive system with use of J1939 data

Figure 5
Waveforms of Additive solution injecting with CAN bus data

Figure 6

Figure 7
Main Loop
Flowchart 1

Figure 8
Alternative Check Additive Level Routine If Pressure Switch Is Used.
Flowchart 2

Figure 9

Injection Period Handling
Flowchart 3

Figure 10

CAN Bus Data Interrupt and Start of Injection Pulse Handling
Flowchart 4

Figure 11

CAN Bus Data Interrupt and Constant Injection Frequency Handling
(All Channels Injecting Simultaneously)
Flowchart 5

Figure 12
Fixed Frequency Injection Rate
Simultaneous Pulsing of All Channels

Figure 13

Ethanol additive system with use of J1939 data and synchronous trigger

SIMPLIFIED METHOD TO INJECT ETHANOL OR OTHER SOLUTION ADDITIVES INTO DIESEL ENGINES EQUIPPED WITH A DIGITAL DATA BUS

CROSS-REFERENCE TO RELATED APPLICATIONS

This application claims priority of U.S. Provisional Patent Application Nos. 61/733,894 filed Dec. 5, 2012; 61/789,327 filed Mar. 15, 2013; and 61/804,727 filed Mar. 24, 2013. The disclosures of the prior applications are incorporated herein in their entirety by reference.

FIELD

The technology herein relates to electronic control systems of internal combustion engines of the compression ignition type. It also relates to emission control systems of compression ignition engines.

BACKGROUND AND SUMMARY

It is known to control various unwanted pollutants that are emitted from the compression ignition diesel engine by use of injecting or fogging the intake air stream of such engines with a mixture of ethanol, water and other substances. Such a system is typically installed as additional equipment to the pre-existing diesel injection system and does not replace the diesel fuel system. Intake air fogging with an ethanol solution reduces the combustion temperature while adding new chemical reactions, thereby reducing Nitrogen Oxides (NOX) and particulate matter rates.

Example non-limiting technology herein addresses the formulation and control of the electrical pulses that are used to turn on and pulse the injector(s), which disperse the ethanol additive solution, and to improved systems and methods that provide automatic injection of additives including but not limited to ethanol and the like into an internal combustion engine to reduce pollutants and for other purposes.

Figure 1:
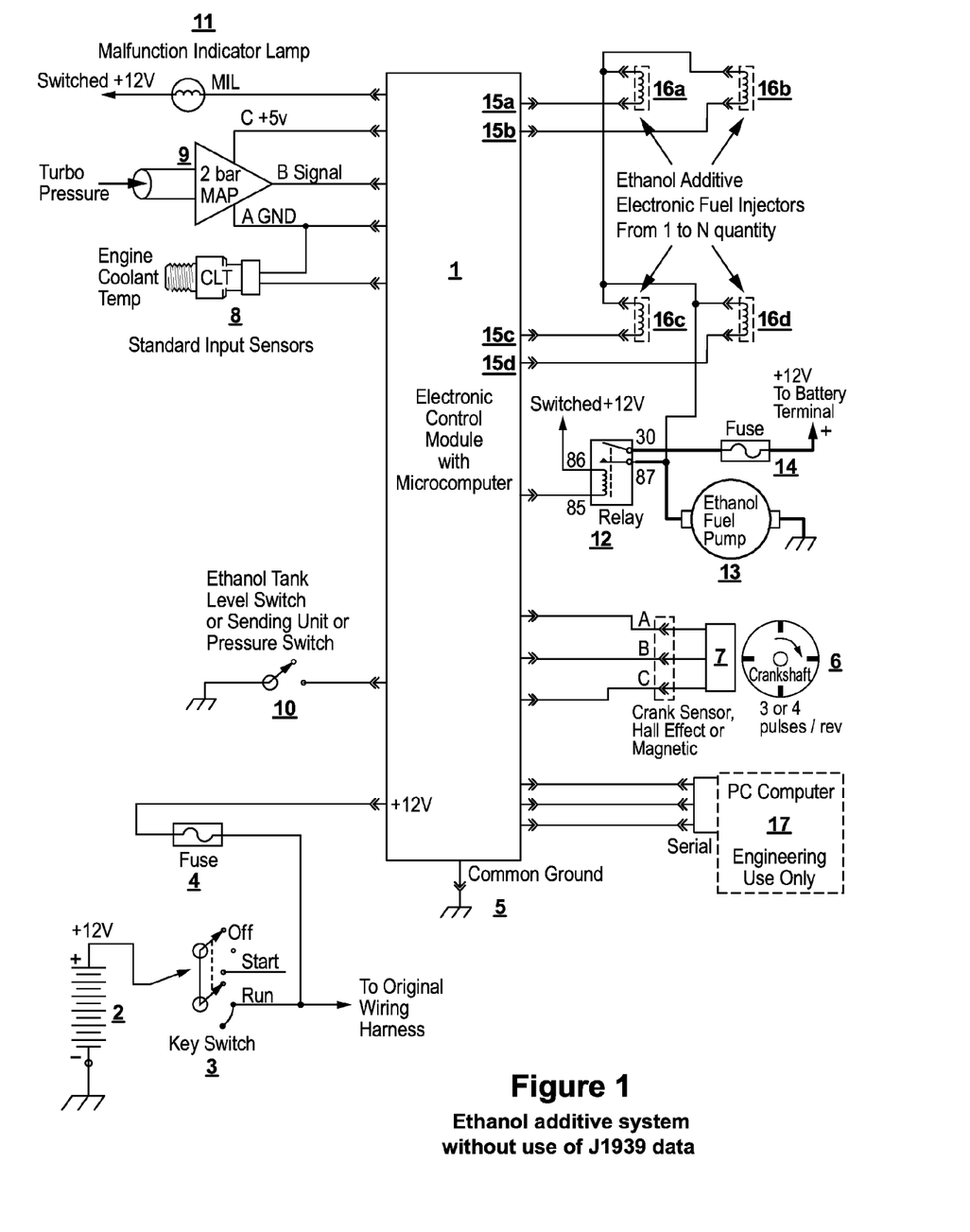
FIG. 1 is block diagram of a conventional system.

FIG. 1 shows an example conventional ethanol additive system of the general type in which the exemplary illustrative non-limiting technology herein can be used. In the particular non-limiting example shown, electronic control module 1 is powered up by connection to the vehicle battery 2, through the key switch 3, and fuse 4. The common ground connection 5 completes the module's power circuit.

A method to detect and synchronize to the engine's crankshaft is installed on the crankshaft consisting of rotating indices 6, consisting of teeth or magnets, which is equal or greater in number to at least the number of cylinders divided by 2. A sensor of either magnetic reluctance or Hall-effect type 7, then delivers a pulse corresponding to the passing of each indicia. Sensor 7 is then wired to module 1.

Another sensor 8, which varies in internal resistance as a function of tip temperature is installed in or near the engine's coolant jacket. This temperature sensor 8, is wired to the module 1, and thereby allows the modules software to determine the temperature of the engine's coolant.

Another sensor 9, is connected by way of tubes or fittings to the engines intake manifold. This sensor varies in output voltage or resistance as a function of the pressure of the intake manifold. This sensor 9, is wired to the module 1, and allows the software to determine the intake manifold or turbo pressure of the engine.

Another sensor 10, is inserted into the ethanol solution tank or pressure line and it determines the presence of an adequate amount of ethanol solution. This sensor is wired to the control module 1 and allows the software to determine if adequate ethanol is available for the system to operate properly.

A malfunction indicator lamp 11, is also connected to the module 1. It shall inform the engine operator that the system is operating correctly or may turn on or flash to indicate trouble such as failed sensors, empty ethanol tank, or other malfunctions.

Should the proper conditions exist of engine rotating determined by sensor 7, warm engine coolant per sensor 8 and adequate additive determined by sensor 10, the module 1, shall activate relay 12, thereby powering on the additive fuel pump 13 and applying power to the fuel injectors 15.

Should a pressure switch be used for #10, a delay may be involved between turning relay 12 on and determining if sufficient pressure is present before injection is started or malfunction is indicated.

Once the proper conditions for additive injection is met, the module 1, reads the intake manifold sensor 9 and the engine RPM via the time pulse spacing of sensor 7 and uses a 3 dimensional "look up and linear interpolation" table to determine the injector pulse width. The module 1 has low side transistor switches 15A to 15D, that turn on injectors 16A to 16D, for an experimentally determined amount of time period. The start of the injector pulse corresponds to the time point(s) at which pulse voltage transitions occur from crankshaft sensor 7. In this way the injector pulse starting points are synchronized to specific angular positions of the crankshaft.

Figure 2:
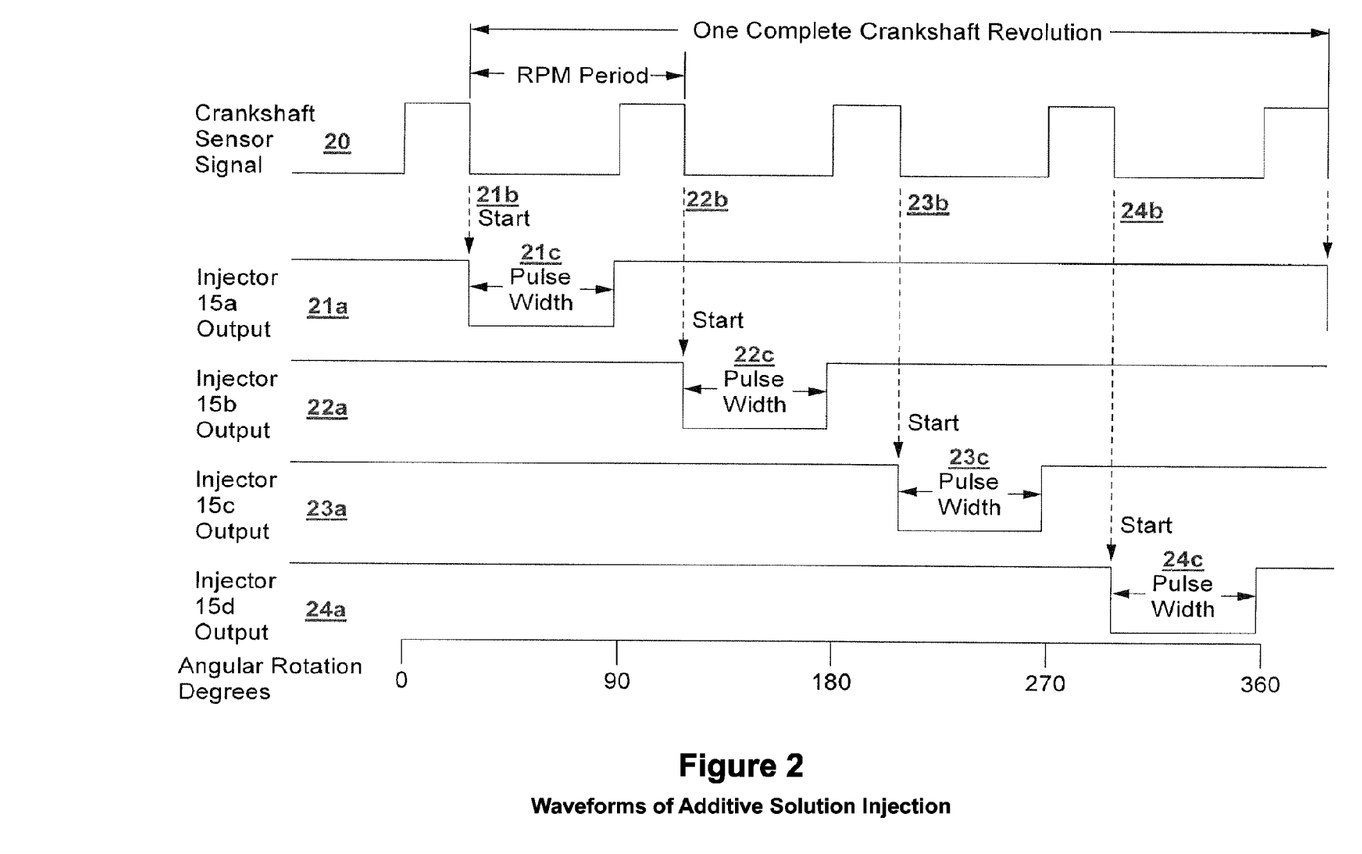
FIG. 2 shows the timing relationship between the crankshaft sensor voltage waveform 20, and the outputs 21 to 24.

FIG. 2 shows an example non-limiting timing relationship between the crankshaft sensor voltage waveform 20, and the outputs 21 to 24. The control module's microcomputer detects a voltage transition of waveform 20, in this case the falling edge 21b. The output voltage waveform of circuit 15a is 21a. When falling edge 21b occurs, a timer channel in the microcomputer is turned on and the injector begins to inject the additive solution. The timer proceeds to time out period 21c.

When the timer completes its time count, the injector output turns off. This cycle is repeated on successive crankshaft sensor voltages 22b, 23b and 24b falling edges thereby producing a sequential injection cycle of other waveforms 22a, 23a and 24a as shown in FIG. 2.

Figure 3:
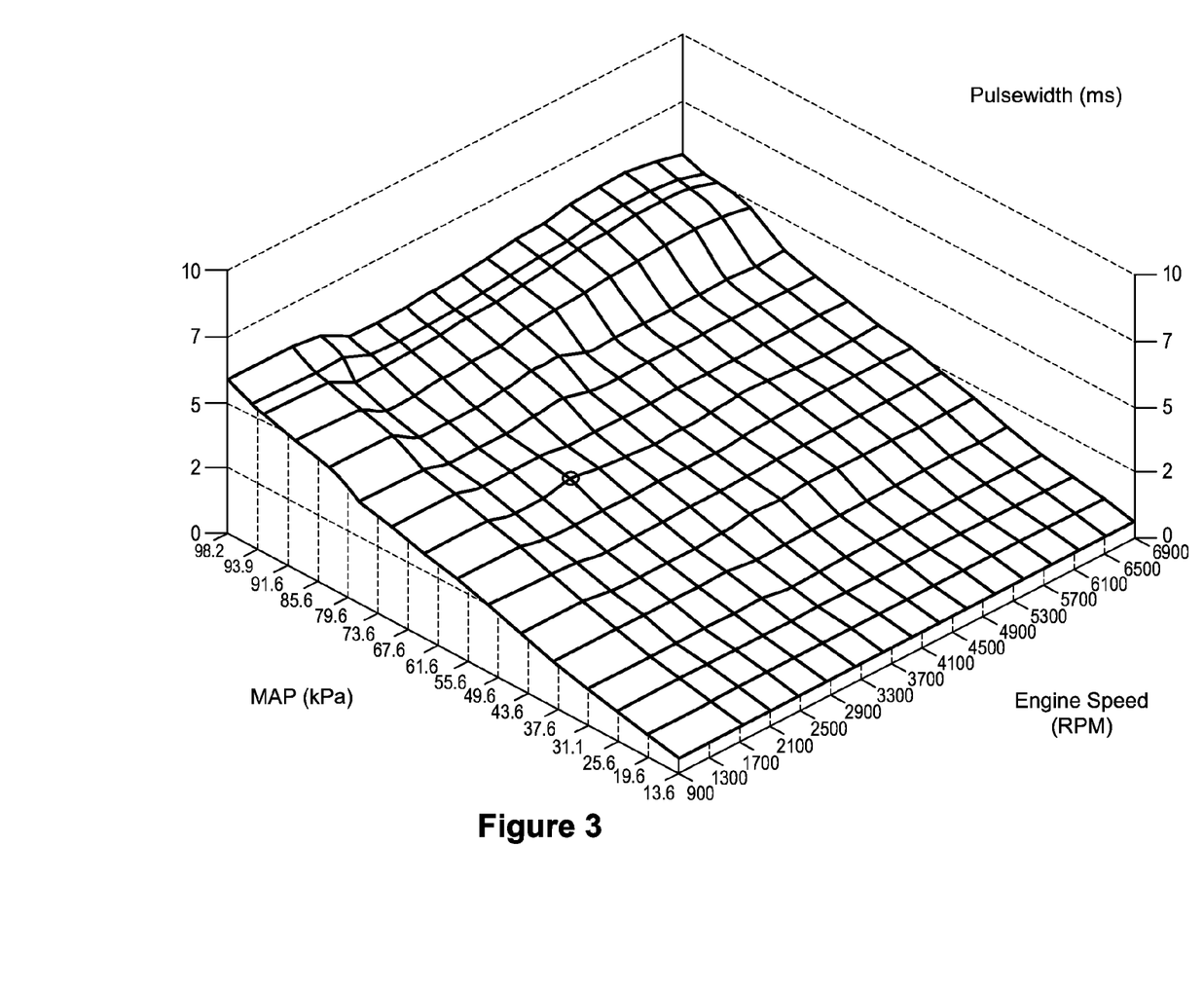
FIG. 3 shows a graphical representation of the relationship between the rotational speed of crankshaft 6 (in RPM) the signal from the manifold pressure sensor (MAP) 9 and the periods of injector pulse widths 15a-d.

In one example non-limiting implementation, the injector period is determined by a 3 dimensional map. The microcomputer code uses a grid of RPM and manifold sensor (MAP) values in combination with linear interpolation and extrapolation routines to determine the current pulse width. FIG. 3 shows a graphical representation of the relationship between the rotational speed of crankshaft 6 (in RPM) the signal from the manifold pressure sensor (MAP) 9 and the periods of injector pulse widths 15a-d.

In one example non-limiting implementation, a determination and subsequent calibration of the injector pulse width grid points is devised and inputted by use of a PC type or other computer 17, which allows the user to alter the injector pulse width and then save the changes regarding coolant temperature, intake manifold pressure 3D points, engine RPM points 3D points, injector pulse widths and other required setup values.

While such conventional ethanol additive systems provide useful functionality, further improvements are possible and desirable. In particular, installing a system of the type shown in FIG. 1 can be expensive due to the many interconnects, sensors and components.

One example non-limiting implementation of the technology herein provides a microcomputer equipped electronic control module that has the necessary circuits to capture data that is available on the industry standard serial communications bus which was adopted by most diesel engine manufactures after 1998. This bus is commonly called "J1939", and refers to the Society of Automotive Engineers (SAE) practices specifications J1939. The example non-limiting technology herein uses this data and software algorithms to eliminate cost and labor of adding additional sensors, which are typically needed to obtain the necessary data to produce the desired result.

The example non-limiting technology herein thus provides a system for the delivery of ethanol or other solution additives to the intake manifold of compression ignition diesel engines. The system may comprise an electronic control module containing a microcomputer capable of monitoring SAE J1939 serial data, receive a signal from an additive monitoring sensor and have outputs to turn on a pump relay, indicator lamp and from 1 to n pulse width modulated electrical fluid injectors. Such a system can retrieve various data parameters from the J1939 data stream such as engine RPM, Engine load, coolant temperature and other data. Such a system can determine if the proper level of additive is present and when the proper engine operating conditions are met, can turn on a fluid pump electrical relay. Such a system can calculate with linear interpolation and extrapolation software routines from data stored in a 3 dimensional array a desired injector pulse width. Such a system does not need to use a crankshaft sensor or other direct means to measure engine speed or crankshaft position and instead is using data from the J1939 data bus. Such a system does not use a pressure sensor or other direct means to measure engine load or fuel rate and instead is using data from the J1939 data bus. Such a system can create a start of injection pulse instants which are not exactly synchronized to the exact position of the crankshaft but occur at a rate of injection which is approximately proportional to the speed of crankshaft rotation and such injection rate is constantly adjusted to the most recently available RPM value as obtained from the J1939 data. Such a system has the ability to allow arbitrary injector output pattern firing-orders by use of a programmable table. Such a system can monitor the additive fluid level or pressure and turn on a diagnostic lamp or notify the operator in another way if the system operation is not within prescribed parameters. Such a system uses a data communications interface to a PC type computer and a graphical human interface to allow for modifications to stored calibration parameters and to see current operating conditions within the system.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 4:
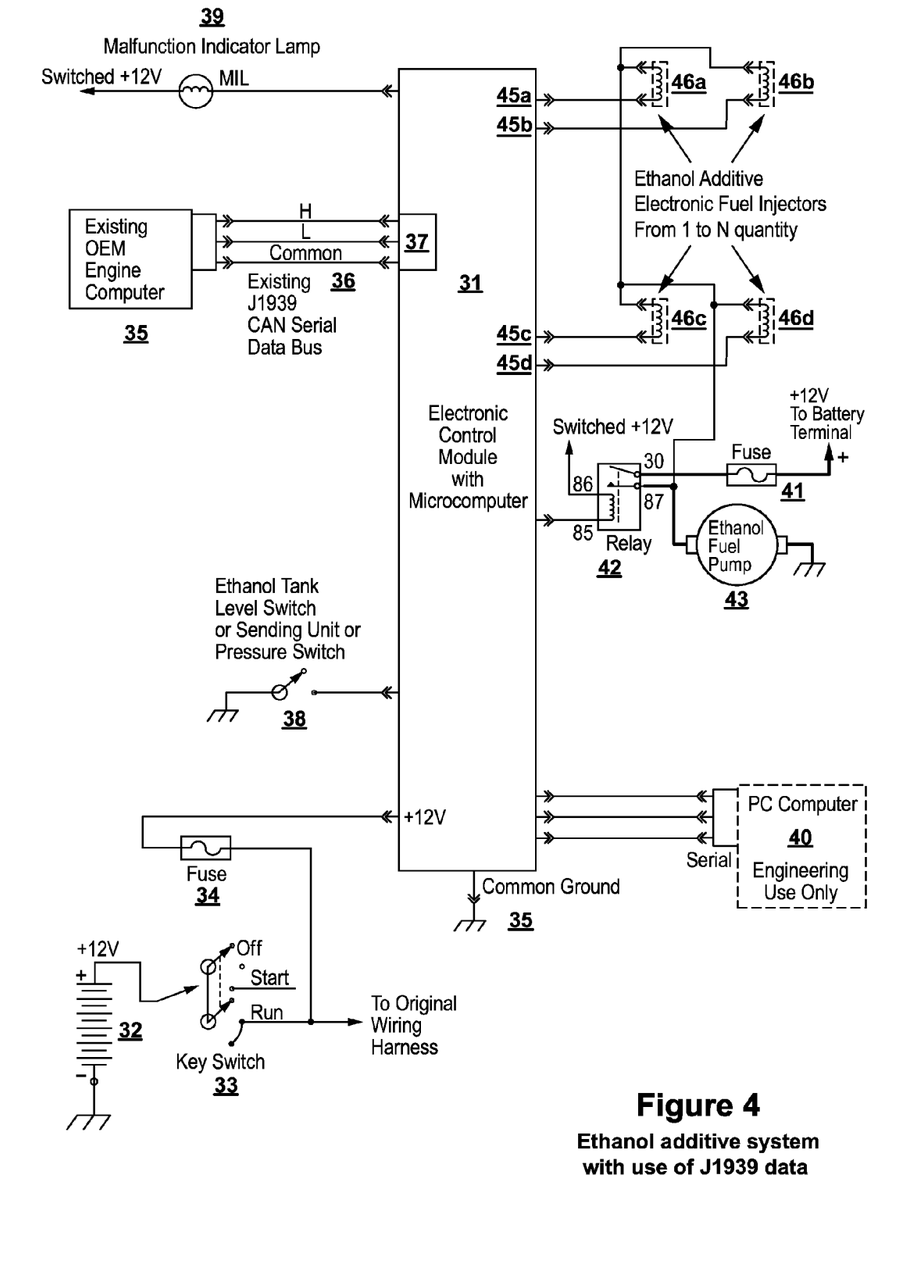
FIG. 4 is an exemplary illustrative non-limiting block diagram of a system with the use of the example non-limiting embodiment.

FIG. 4 is an exemplary illustrative non-limiting block diagram of a system with the use of the example non-limiting embodiment. The example non-limiting embodiment utilizes an Electronic Control Module 31, which is powered up by connection to the vehicle battery 32, through the key switch 33, and fuse 34. The common ground connection 35, completes the module's power circuit.

The application of the example non-limiting embodiments exploits use of an existing Original Equipment Manufacture (OEM) engine control computer 35. Such OEM computer 35 may for example use an industry standard SAE J1939 serial data bus. Such a data bus is described in a series of standards published by the Society of Automotive Engineers including core standards J1939_201206 (Serial Control and Communications Heavy Duty Vehicle Network—Top Level Document); J1939/1_201211 On-Highway Equipment Control and Communication Network; J1939/11_201209 Physical Layer, 250 Kbps, Twisted Shielded Pair; J1939/13_$_{201110}$ Off-Board Diagnostic Connector; J1939/14_$_{201110}$ Physical Layer, 500 Kbps; J1939/15_200808 Reduced Physical Layer, 250K bits/sec, UN-Shielded Twisted Pair (UTP); J1939/21_201012 Data Link Layer; J1939/3_200812 On Board Diagnostics Implementation Guide; J1939/31_201005 Network Layer; J1939/5_201204 Marine Stern Drive and Inboard Spark-Ignition Engine On-Board Diagnostics Implementation Guide; J1939/71_201205 Vehicle Application Layer (Through May 2011); J1939/73_201002 Application Layer—Diagnostics; J1939/74_201011 Application—Configurable Messaging; J1939/75_201105 Application Layer—Generator Sets and Industrial; J1939/81_201106 Network Management; J1939/82_200808 Compliance—Truck and Bus; and J1939/84_201206 OBD Communications Compliance Test Cases for Heavy Duty Components and Vehicles, each of which are incorporated herein by reference.

As described in detail in the above-listed SAE specifications, such a J1939 bus will contain 3 wires 35, called "H", "L" and "Common". These wires 35, are connected to electronic control module 31, which contains the necessary Controller Area Network (CAN) bus interface electronic circuits so that the microcontroller contained within 31, can read the data which is presented on the serial data bus wires 35.

A sensor 38, is inserted into the ethanol solution tank or pressure line and it determines the presence of an adequate amount or pressure of additive solution. This sensor is wired to the control module 31 and allows the software to determine if adequate additive is available for the system to operate properly.

A malfunction indicator lamp 39, is also connected to the module 31. It shall inform the engine operator that the system is operating correctly or may turn on or flash to indicate trouble such as failed sensors, empty ethanol tank, or other malfunctions.

Control module 31, has software that can read standard J1939 data information pertaining to:
1. Engine Rotational Speed (RPM)
2. Engine Coolant Temperature (CLT)
3. Engine Load Demand or Fuel Rate (Load)
4. Throttle Position Sensor (TPS)
5. Others as needed.

The particular data structure, addresses and protocol information regarding each datum can be found in public specifications cited above.

The microcontroller in 31 maintains a data stack of the desired current values of this CAN bus data. Should the proper conditions exist of engine rotating above a certain value, engine coolant temperature above a certain value, an adequate ethanol supply determined by sensor 38, the module 31, shall activate relay 42, thereby powering on the ethanol additive fuel pump 43 and applying power to the ethanol fuel injectors 46.

Figure 7:
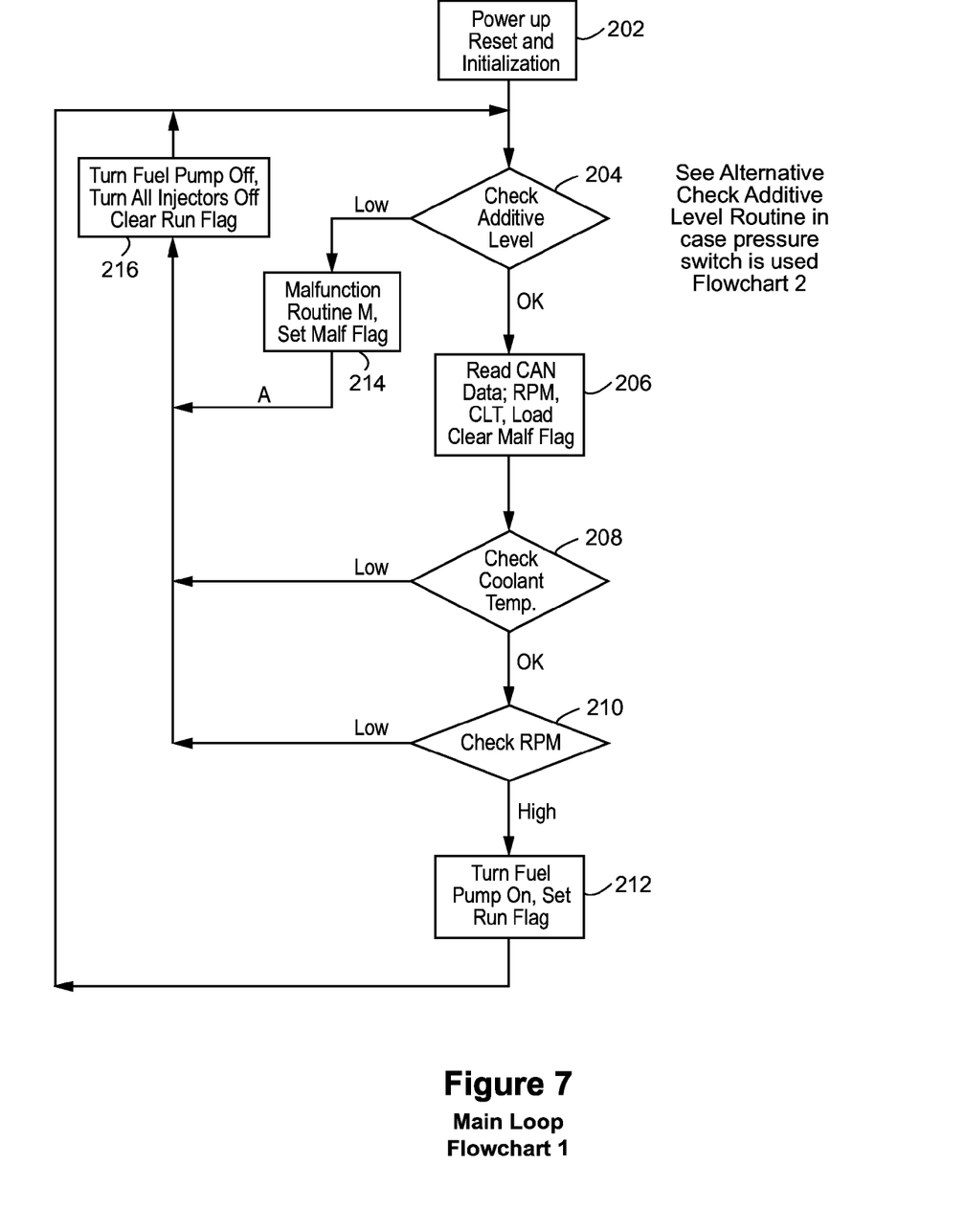
FIG. 7 is a flowchart of an exemplary illustrative main loop.

FIG. 7 shows a flowchart of example non-limiting steps performed by microcomputer 31 under control of instructions stored in a non-transitory memory device such as within a read only memory, flash memory or the like included within electronic control module with microcomputer 31. In this non-limiting example, the microcomputer 31 powers up, resets and initializes (block 202) and then checks the additive level (block 204). If the additive level is low ("low" exit to decision block 204), the microcomputer executes a malfunction routine M and sets a Maif flag (block 214). Otherwise ("okay" exit to block 204), the system reads various values from the J1939 bus (e.g., CAN, RPM, CLT) and loads the clear Maif flag (block 206). The microcomputer 31 then checks coolant temperature (block 208) and RPM (block 210). If the coolant temperature or RPM are low ("no" exits of blocks 208, 210), the microcomputer 31 turns off the fuel pump, turns all injectors off, and clears a run flag (block 216). If the coolant temperature is ok (block 208) and the RPM is high (block 210), the microcomputer 31 and turns the fuel pump on and also sets the run flag) (block 212).

Figure 8:
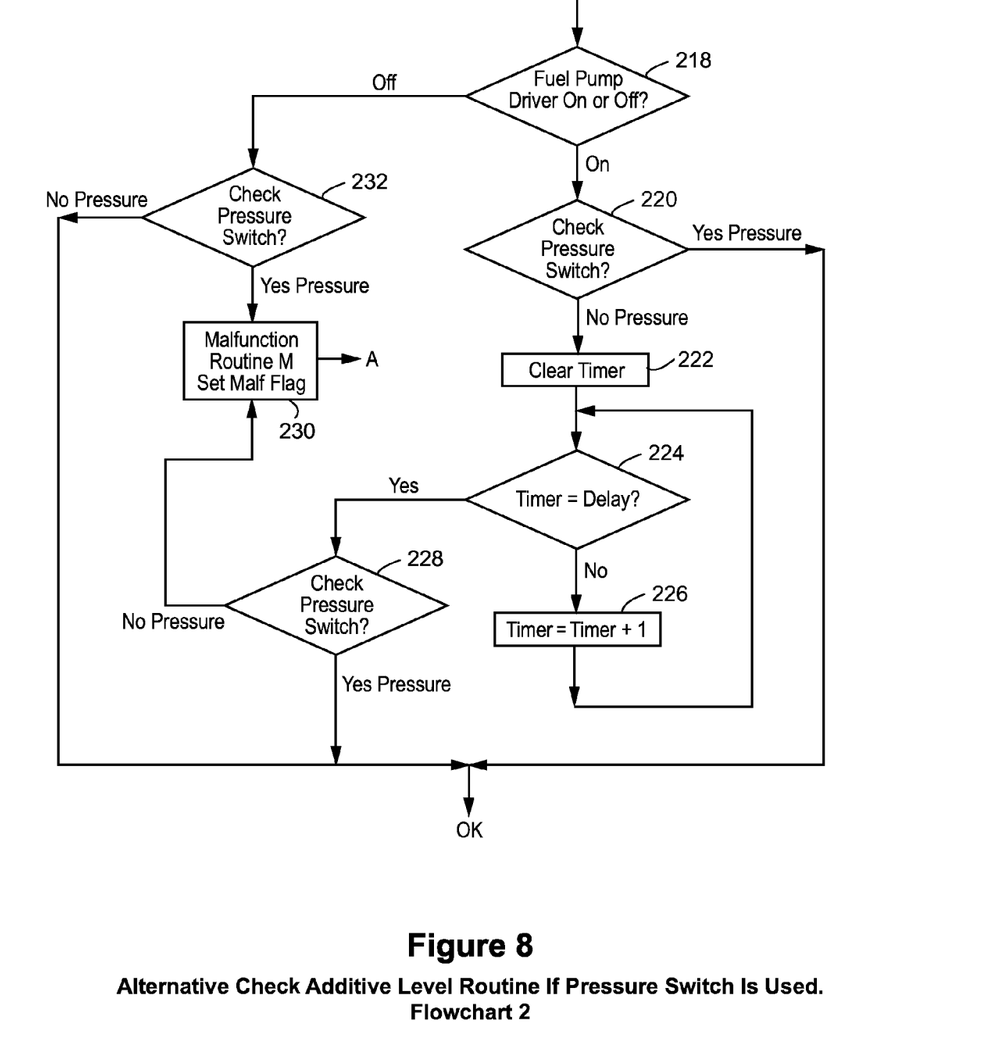
FIG. 8 is a flowchart of an exemplary alternative check additive level routine if pressure switch is used.

Should a pressure switch be used for 38, a delay may involved between turning relay 42 on and determining if sufficient pressure is present before injection is started or malfunction is indicated. The flowchart of FIG. 8 shows an example non-limiting implementation in which the microcomputer 31 detects whether the fuel pump is on or off (block 218). If on, the microcomputer 31 checks the pressure switch (block 220). If no pressure (block 220 "No pressure" exit), the microcomputer 31 clears a timer (block 222) then determines whether the timer value is equal to a delay (block 204). If not equal, then the timer is incremented (block 226) and block 224 is repeated. Once the timer=delay ("yes" exit to decision block 224), microcomputer 31 checks the pressure switch (block 228) and if no pressure, runs a malfunction routine M (block 230). If at block 218 the fuel pump driver is off ("off" exit), the microcomputer 31 checks the pressure switch (block 232) and if there is pressure ("yes pressure") executes the malfunction routine M (block 230). Meanwhile, the "No pressure" exit of decision block 232, "Yes pressure" exit of block 228 and "Yes pressure" exit of block 220 all indicate proper operation ("ok" exit at the bottom of FIG. 8).

Figure 9:
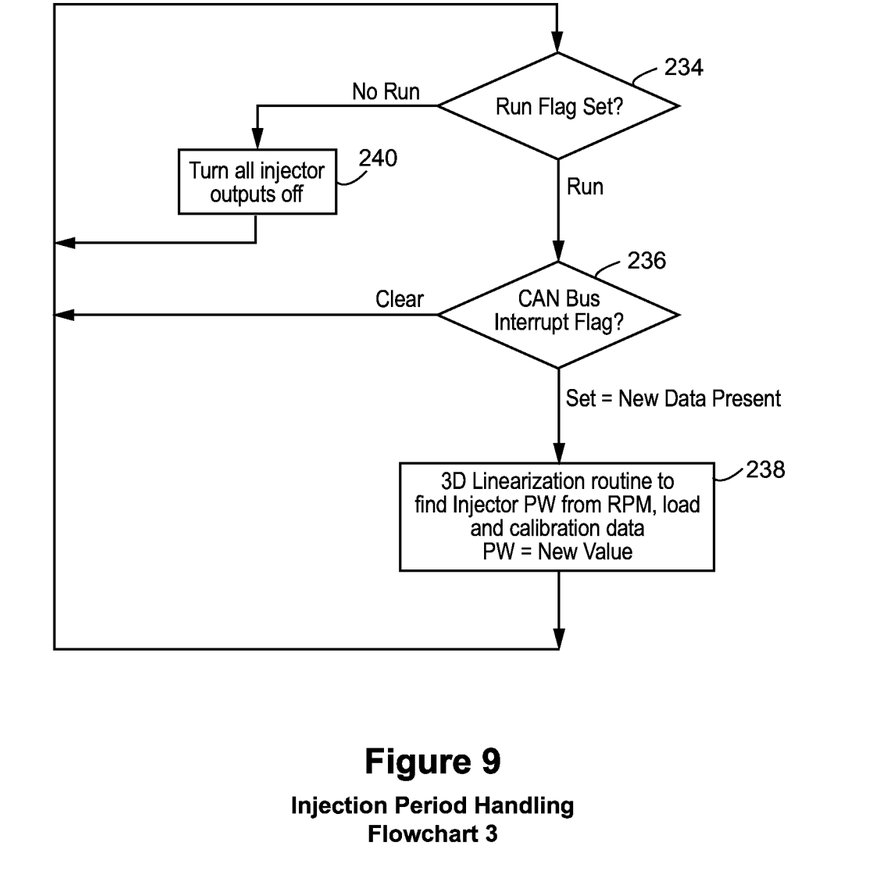
FIG. 9 is a flowchart of exemplary illustrative injection period handling.

When proper conditions for additive injection are met by the module 31, the Engine Load and the engine RPM via CAN bus 37 are used in a 3 dimensional "look up and linear interpolation" table to determine the injector pulse width. The module 31 has low side transistor switches 45a to 45d, that turn on injectors 46a to 46d, for an experimentally determined amount of time period. The flowchart of FIG. 9 shows an example non-limiting injection period handling wherein when the run flag is set "Run" exit to block 234), microcomputer 31 tests the CAN bus interrupt flag (block 236) and if set (meaning that new data is present), executes a 3D linearization routine (block 238) to find injector pulse width (PW) from RPM, load and calibration data and sets PW to a new value. Otherwise, if decision block 234 determines that the run flag is not set ("no run" exit), microcomputer 31 turns all injector outputs off (block 240).

Figure 10:
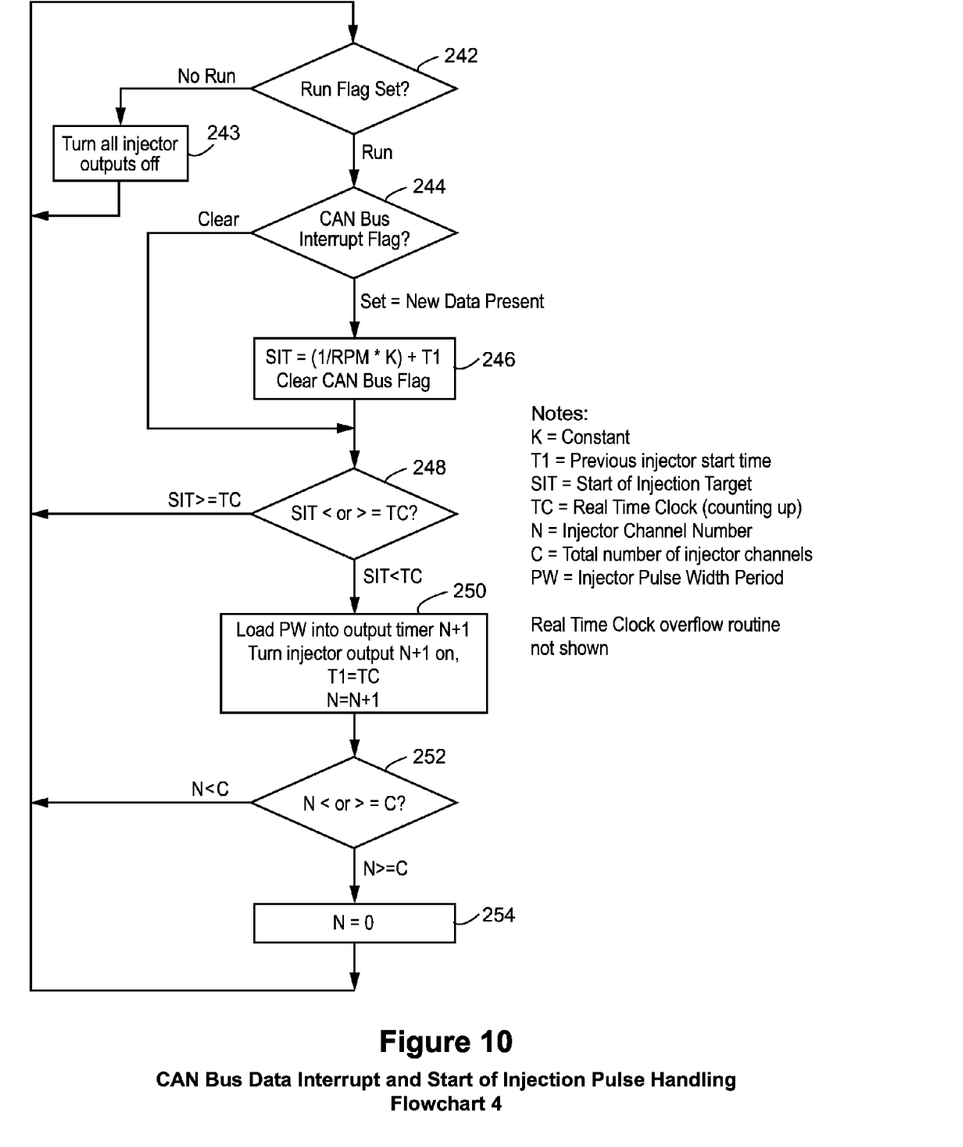
FIGS. 10 and 11 are flowcharts of exemplary illustrative injection pulse handling.

When the engine RPM is above a certain value and other conditions are met, the microcomputer establishes an internal start of injection pulse period. The period of repetition is determined by the equations shown in the flowchart of FIG. 10 providing an example non-limiting implementation. In FIG. 10, if the run flag is set ("run" exit to block 242), microcomputer 31 detects whether the CAN bus interrupt flag is set (block 244). If it is set, then decision block 248 detects whether start of injection target (SIT) is less than the real time clock (TC) or whether it is greater than or equal to TC. If less than, then microcomputer 31 loads the pulse width (PW) into an output timer N+1, turns the injector output N+1 on, and then sets T1=TC and N=N+1 (block 250). Microcomputer 31 then tests whether the injector channel number N is less than the total number of injector channels (block 252). If less than, microcomputer 31 repeats the FIG. 10 flow for the next injector. Otherwise, microcomputer 31 sets N=0 (block 254) and repeats the flow for the first injector.

DEFINITIONS

RPM Current Engine RPM in Revolutions per Minute at any time
TC Free running time clock
K Constant scalar
SIT Start of Injection Target
T1 Previous start of injector time
PW Pulse Width of Injector on time
N Current injector channel
C Total number of injector channels In more detail, where RPM is the current RPM read at the fastest rate which is available from the CAN bus 37. The start of the first injection pulse from output 45a is arbitrary and not synchronized to the engine position. A time stamp value T1 is saved when injector 45a is turned on. The microcomputer determines a time in the future to the start the next output 45b.

$$SIT = (1/RPM * K) + T1$$

During the time after the start of the injector pulse start, T1, the microcomputer compares the current free running time clock TC to the next start of injection target SIT. When the current time TC is greater than SIT the next output, 45b, is started and the start time T1 is reset. This repeats continuously thereafter until the additive injection conditions are no longer met. The flowchart of FIG. 10 represents this routine.

The SIT value and hence the future start target is continually being updated as new RPM data emerges from the J1939 CAN bus. The refresh rate of the RPM data can be substantially faster than the injection rate. If the engine is slowing down, the target value will be over written to a later value in "mid count" to reflect a later starting point for the next injector start point. If the engine is accelerating, the period will be over written with a shorter value to start the next injection sooner.

Should an earlier start target SIT, be forced into the comparison than the current time clock, the next injection event will start immediately and the next start point will be computed.

In this way, the start of injection pulses are not exactly synchronized to the exact position of the crankshaft but the rate of injections is proportional to the speed of crankshaft rotation and such injection rate is constantly adjusted to the most recently available RPM value.

Sequencing of injector outputs can be preset in a programmed order. For this the microcomputer maintains a sequence counter, N. The sequence counter is advanced after the start of each start of injection. Then it is compared to the current value of the sequence counter to determine actually which one of the injector outputs 45a to 45d to start. Single or multiple injector outputs can turn on at the same time and the design is not limited to 4 as shown in the figures.

Figure 5:
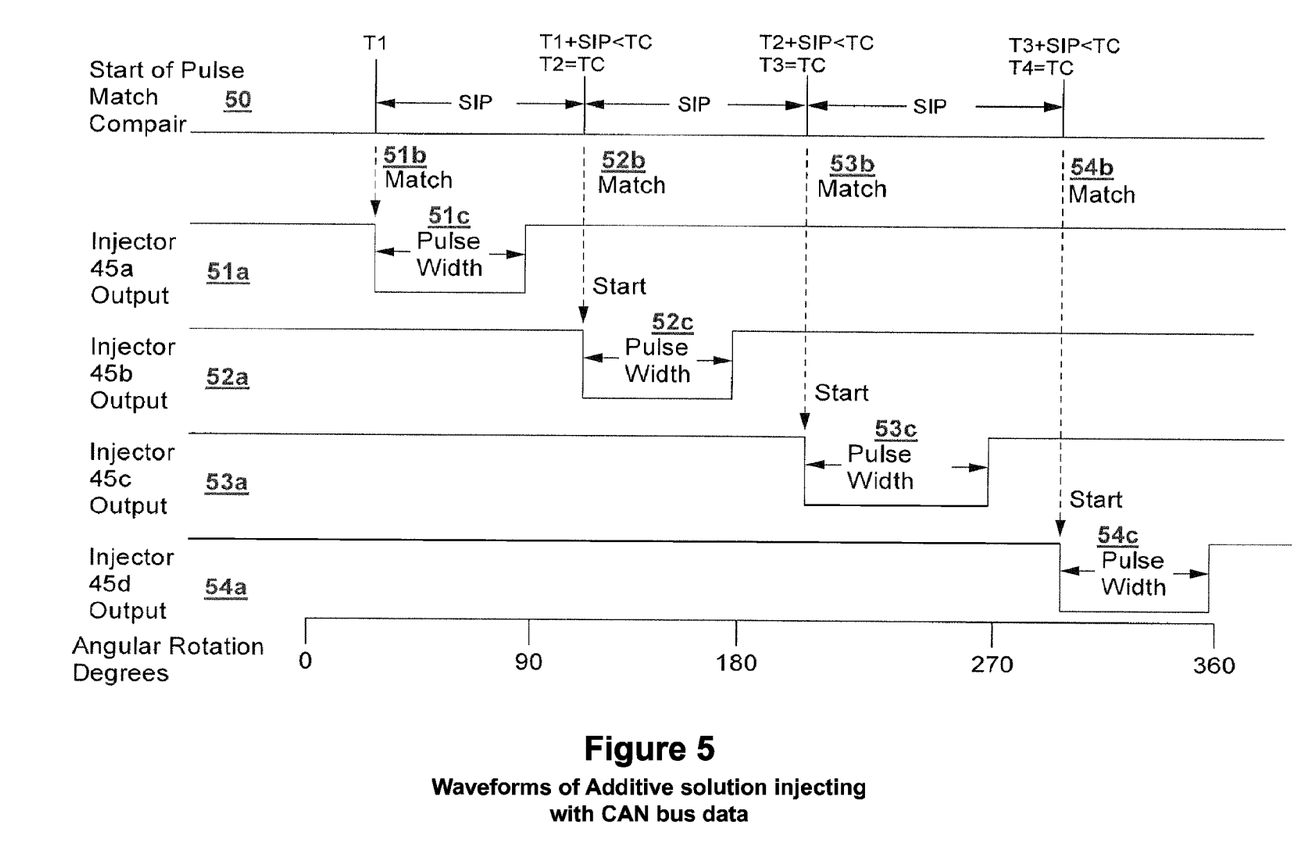
FIG. 5 shows the timing relationship between the start of injector waveforms, and the outputs 45a to 45d.

FIG. 5 shows the timing relationship between the start of injector waveforms, and the outputs 45a to 45d. Start point T1 is arbitrary and occurs at the initiation of additive injections. Based on the engine RPM as read from the J1939 data the SIP period is calculated and added to T1. This new number SIT is placed into a match compare register. When the time clock compares its time count and exceeds the match register, the next injector output turns on. This cycle is repeated on successive match compares of the free running time clock thereby producing a sequential injection cycle of other waveforms 52a, 53a and 54a as shown in FIG. 5.

Figure 6:
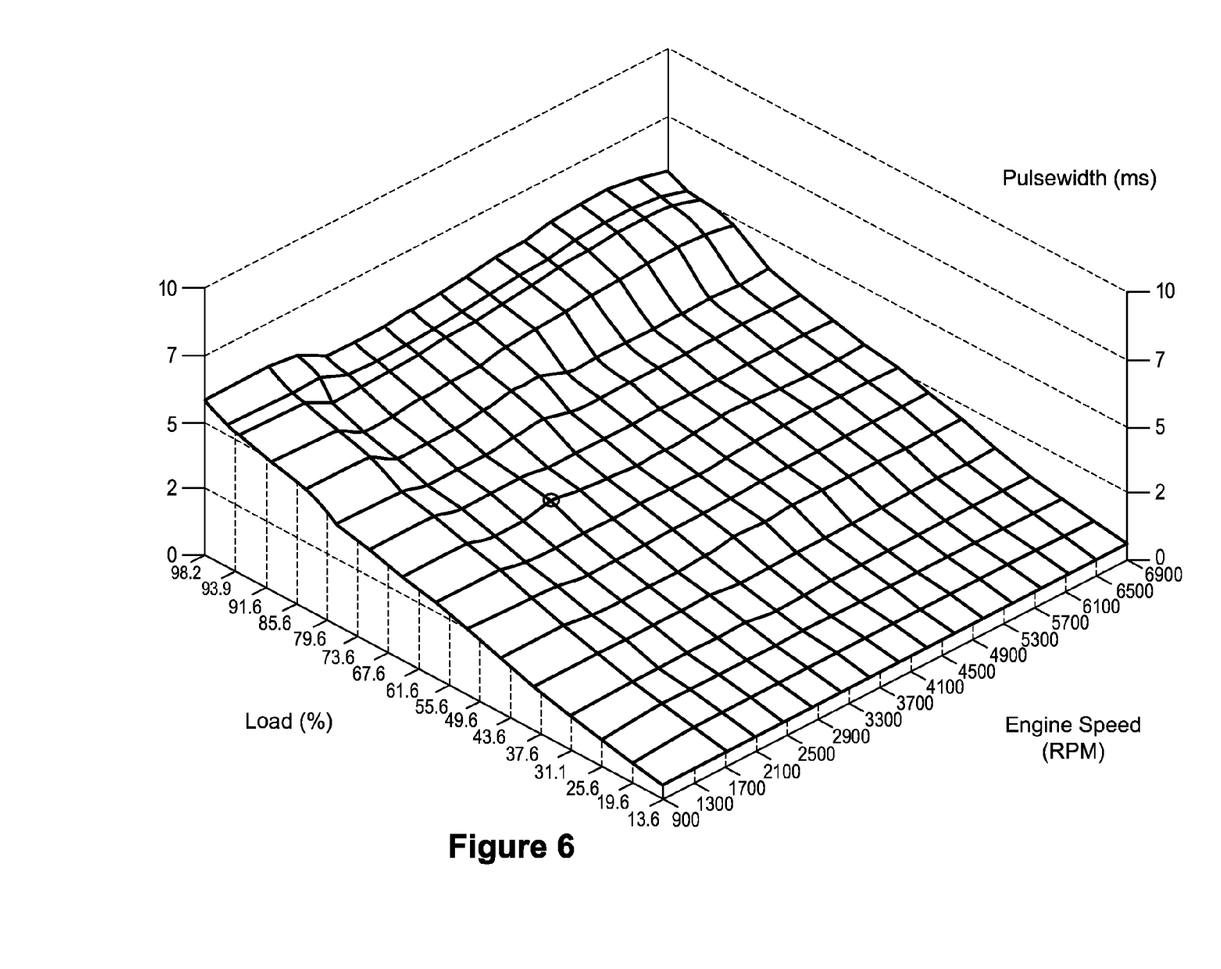
FIG. 6 shows a graphical representation of the relationship between the rotational speed of crankshaft RPM, the load value and the injector pulse widths.

The injector period PW is determined by a 3 dimensional map. The microcomputer code uses a grid of RPM and manifold sensor values in combination with linear interpolation and extrapolation routines to determine the current pulse width. FIG. 6 shows a graphical representation of the relationship between the rotational speed of crankshaft RPM, the load value and the injector pulse widths.

An example non-limiting determination and subsequent calibration of the injector pulse width grid points is devised and inputted by use of a PC type computer 40, which allows the user to alter the injector pulse width and then save the changes regarding coolant temperature, intake manifold pressure 3D points, engine RPM points 3D points, injector pulse widths and other required setup values.

Figure 12:
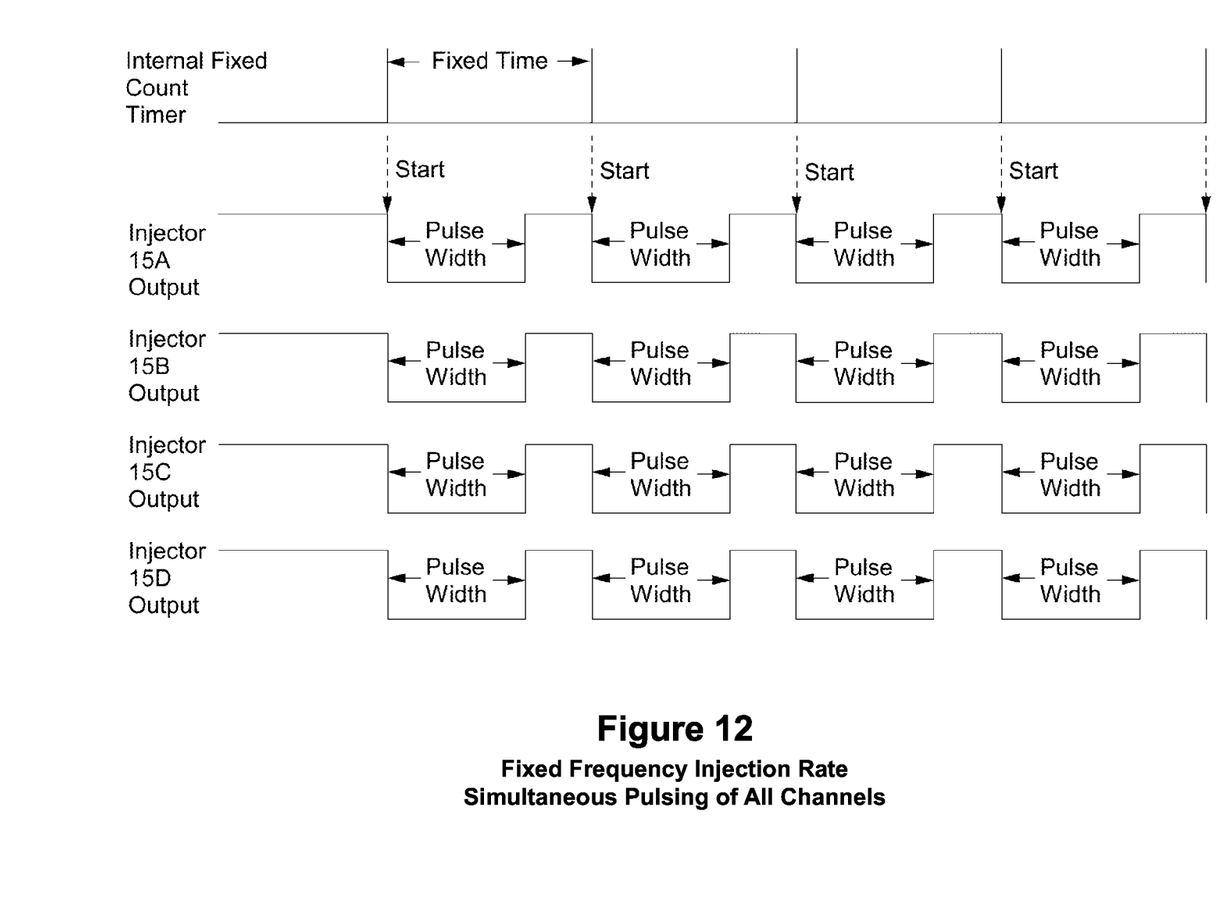
FIG. 12 shows example timing relationships between the start of injector waveforms and the outputs 45a to 45d for a concurrent operating mode.

An alternative model that simplifies the implementation of the injection pulse calculation uses a fixed time period between injection pulses rather than varying the injection pulse frequency with engine RPM (see FIG. 12).

Figure 11:
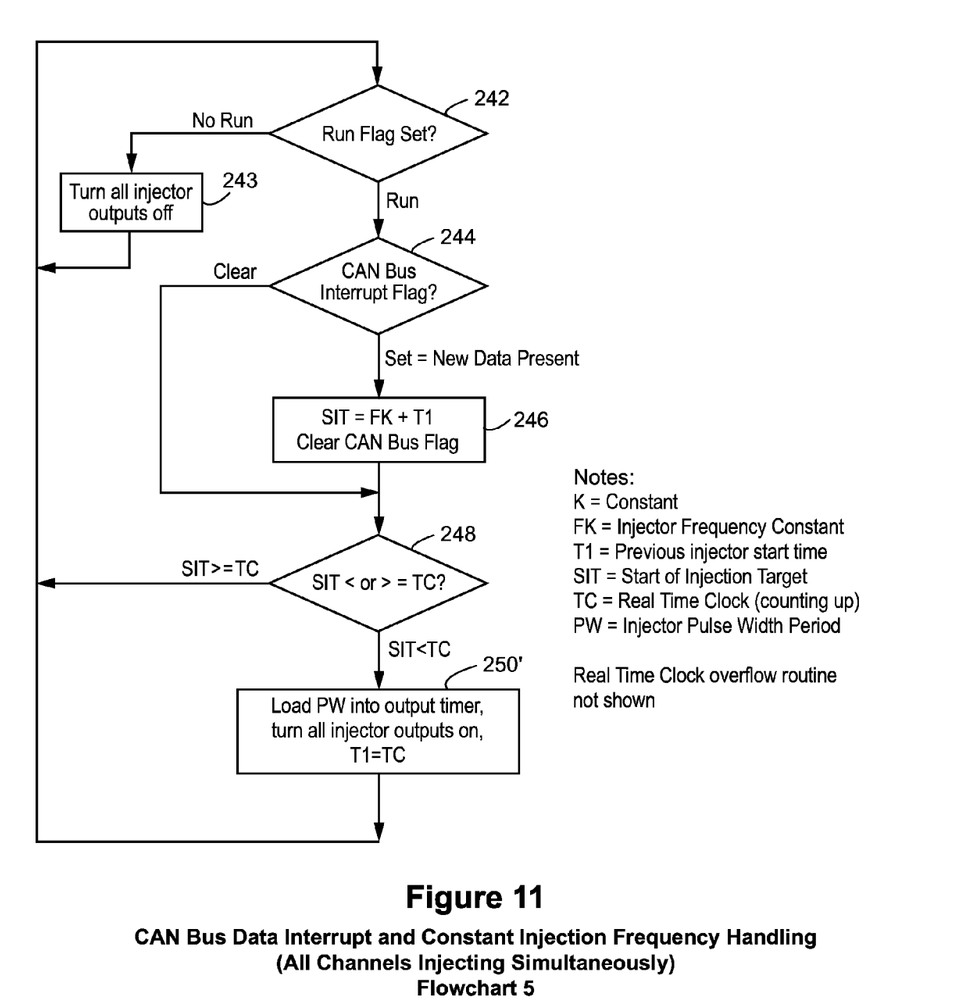

This method eliminates a repeated calculation and allows the use of commonly available hardware peripherals available in most micro-controllers. The only change between this method and the previously described method is that the calculation for SIT (shown in flowchart FIG. 4) is replaced with a predefined constant and all of the injector channels are pulsed simultaneously, eliminating the injector channel number increment and the final two (2) steps shown in flowchart FIG. 4. This change is shown in Flowchart FIG. 11 block 250'.

Using a fixed time between injection pulses completely eliminates all synchronization between the injection pulses and may have undesirable effects resulting from beat frequencies resulting from the difference between the injection pulse event frequency and the cylinder air intake event frequency.

Although FIG. 12 shows all available injector channels turning on and pulse with the same pulse width, it is possible to sequence individual injector channels at the fixed pulse frequency. In this case the final counters "N" as shown in figure the last decision and state boxes of FIG. 10 shall be concatenated on the end of FIG. 11.

Figure 13:
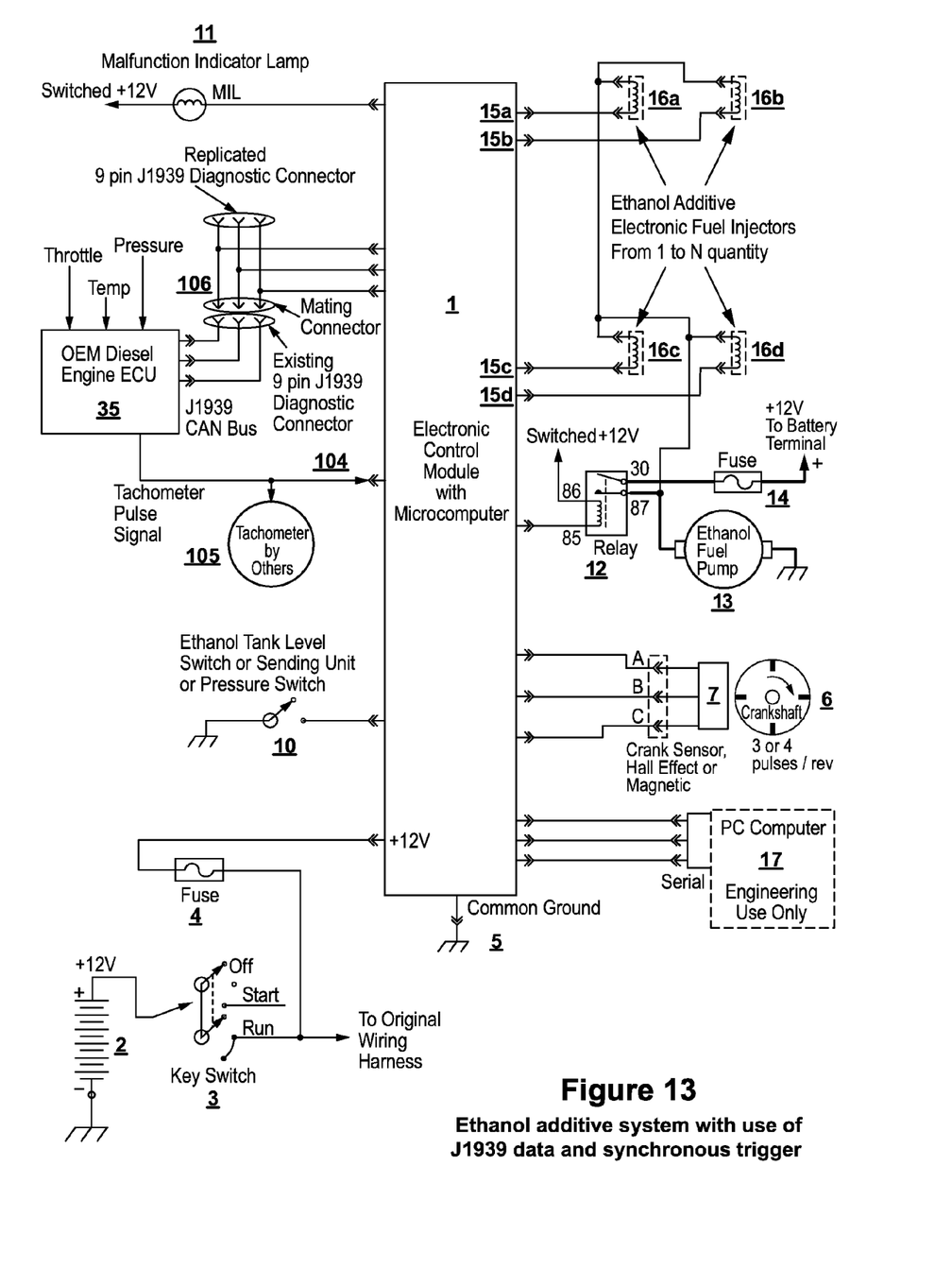
FIG. 13 shows a block diagram of a further non-limiting embodiment.

Another alternative non-limiting embodiment shown in FIG. 13 takes the features of FIG. 1 and removes some but not all of the external sensors stated in previous models. While it simplifies the implementation slightly by removing sensors MAP 9, and CLT 8 of FIG. 1, it allows the use of parameter values that are only generated within OEM engine computer 35. FIG. 13 shows that this implementation still uses either external crankshaft sensor 7, or OEM computer generated tachometer pulse 104. Typically OEM computers generate this pulse to drive instrument cluster tachometers 105. The subject computer would, if a crankshaft sensor were not used, splice into this wire in a "T" fashion to utilize this alternate signal. Typically 3 pulses per engine revolution for a 6-cylinder engine or 4 pulses for an 8 cylinder. While the edges of this pulse signal are not known to be exactly coordinated at a given angular position of the crankshaft, this signal's frequency is directly proportional to the engine RPM.

This method retains the synchronous injector pattern as shown in FIG. 2. The crankshaft pulse signal from sensor 7, or tach signal 104 is shown as waveform line 20 of FIG. 2. Injector pulse widths 21c to 24c would be calculated in the same manner as the above methods.

To simplify wiring of J1939 CAN bus of ECU 35, the model uses a "T" shaped connection wire harness 106 of FIG. 13 to existing J1939 standard connectors. In this case, a 9 pin round connector per the J1939 SAE specification. It also may be a 2 pin or 3 pin connector. One connector is a male type and the other is a female type. The "T" harness would be inserted between the existing connector on the truck and other downstream equipment.

While the technology herein has been described in connection with exemplary and illustrative non-limiting embodiments, the invention is not to be limited by the disclosure. The invention is intended to be defined by claims and to cover all corresponding and equivalent arrangements whether or not specifically disclosed herein.

We claim:
1. A secondary injection system for injecting an additive into the intake manifold of a compression ignition diesel engine of the type having a primary fuel system and a changeable rotation speed, the system comprising:
   an additive monitoring sensor; and
   an electronic controller comprising:
      a clock signal generator that generates a clocking signal having a rate that is independent of the rotation speed of the compression ignition diesel engine;
      a microcomputer coupled to the clock signal generator and configured to monitor data providing rotation speed of the compression ignition diesel engine, receive a signal from the additive monitoring sensor and output a pulse width modulated fluid injector pulse train; and
   a driving circuit connected to receive the pulse width modulated fluid injector pulse train, the driving circuit generating control signals configured to control 1 to n pulse width modulated electrical additive injectors that are not part of the primary fuel system, the additive injectors for injecting an additive into the intake manifold of the compression ignition diesel engine,
   wherein the microcomputer is configured to not synchronize the pulse width modulated fluid injector pulse train with position of the diesel engine but instead to command injection pulse instants which are unsynchronized to engine position and which occur at an injection rate which is referenced to the clocking signal rate, the microcomputer continually adjusting the commanded injection pulse instants in response to changes in rotation speed of the compression ignition diesel engine.

2. The system of claim 1 wherein the microcomputer retrieves various data parameters from a J1939 data stream including engine RPM, Engine load, and coolant temperature.

3. The system of claim 1 wherein the microcomputer determines if the proper level of additive is present and when the proper engine operating conditions are met, is configured to turn on a fluid pump electrical relay.

4. The system of claim 1 wherein the microcomputer calculates with linear interpolation and extrapolation software routines from data stored in a 3 dimensional array a commanded injector pulse width.

5. The system of claim 1 wherein the system does not use a crankshaft sensor or other direct means to measure engine position.

6. The system of claim 1 wherein the system does not use a pressure sensor or other direct means to measure engine load or fuel rate.

7. The system of claim 1 wherein the engine has a crankshaft, and the microcomputer is configured to create start of injection pulse instants which are not exactly synchronized to the exact position of the engine crankshaft but occur at a rate of injection which is approximately proportional to the speed of crankshaft rotation and such injection rate is constantly adjusted to the most recently available RPM value as obtained from a J1939 data.

8. The system of claim 1 including an ability to allow selectable injector output pattern firing-orders by use of a programmable table.

9. The system of claim 1 wherein the microcomputer is further configured to monitors the additive fluid level or pressure and turn on a diagnostic lamp or notify the operator in another way if the system operation is not within prescribed parameters.

10. The system of claim 1 wherein the microcomputer is configured to use a data communications interface to a PC type computer and a graphical human interface to allow for modifications to stored calibration parameters and to see current operating conditions within the system.

11. The system of claim 1 wherein the microcomputer is configured not to require discrete sensor devices to directly measure engine load or engine temperature.

12. A method for injecting a fluid additive into the intake manifold of a compression ignition diesel engine of the type having a primary fuel delivery system and a changeable rotation speed, the method comprising:
generating a clocking signal having a rate that is independent of the rotation speed of the compression ignition diesel engine;
monitoring, with at least one processor, data providing rotation speed of the compression ignition diesel engine;
receiving, with the at least one processor, a signal from an additive monitoring sensor;
generating, with the at least one processor, a pulse width modulated fluid injector pulse train without synchronizing the pulse width modulated fluid injector pulse train with position of the diesel engine but instead by determining injection pulse instants which are unsynchronized to engine position and which occur at an injection rate which is referenced to the clocking signal rate;
continually adjusting the determined injection pulse instants in response to changes in rotation speed of the compression ignition diesel engine; and
in response to the modulated fluid injector pulse train, generating drive signals configured to control 1 to n pulse width modulated electrical additive injectors that are not part of the primary fuel system and which inject an additive into the intake manifold of the compression ignition diesel engine.

13. The method of claim 12 wherein the additive comprises ethanol.

14. The method of claim 12 further including obtaining data providing rotation speed from a J1939 serial bus.

15. The method of claim 12 wherein the method is performed by a retrofit kit configured to be added to a preexisting OEM diesel engine and associated primary fuel delivery system.

16. A secondary injection retrofit kit for adding secondary additive fluid injection to a compression ignition diesel engine of the type having a primary fuel delivery system and a changeable rotation speed, the kit comprising:
an additive monitoring sensor;
at least one pulse width modulated additive fluid injector that is additional to the primary fuel system; and
an electronic controller comprising:
a clock signal generator that generates a clocking signal having a rate that is independent of rotation speed of the compression ignition diesel engine;
a connector that connects to a data bus that carries rotation speed of the diesel engine;
at least one processor coupled to the clock signal generator and connectable to the connector and the sensor, the processor configured to: (a) monitor data on the data bus to obtain the rotation speed of the compression ignition diesel engine, (b) monitor a signal from the additive monitoring sensor, (c) generate pulse width modulated fluid injector pulses which are unsynchronized to engine position and which occur at an injection rate referenced to the clocking signal rate, and (d) continually adjust the timing of the injection pulses in response to changes in rotation speed of the compression ignition diesel engine; and
a driving circuit connected to receive the pulse width modulated fluid injector pulses, the driving circuit generating injector drive signals to drive the at least one pulse width modulated electrical additive fluid injector.

17. The kit of claim 16 wherein the connector is configured to connect to a J1939 serial bus.

18. The kit of claim 17 wherein the at least one processor is separate and distinct from a further processor that controls the primary fuel delivery system, and communication between the at least one processor and the further processor is only through the connector.

19. The kit of claim 16 wherein the kit further includes an additive fluid pump, and the at least one processor is configured to produce a signal that selectively activates the pump.

20. The kit of claim 19 wherein the sensor comprises an additive fluid pressure sensor.

* * * * *